US007127940B2

(12) United States Patent
Shin et al.

(10) Patent No.: US 7,127,940 B2
(45) Date of Patent: Oct. 31, 2006

(54) DIAGNOSIS METHOD FOR LIQUEFIED PETROLEUM INJECTION FUEL PUMP

(75) Inventors: Chang-Hyun Shin, Suwon-si (KR); Hong-Suk Choi, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/118,835

(22) Filed: Apr. 29, 2005

(65) Prior Publication Data

US 2005/0241378 A1 Nov. 3, 2005

(30) Foreign Application Priority Data

Apr. 29, 2004 (KR) ...................... 10-2004-0029977

(51) Int. Cl.
*G01M 15/00* (2006.01)

(52) U.S. Cl. .................................................... 73/119 R

(58) Field of Classification Search .................. 73/116, 73/117.2, 117.3, 118.1, 119 A, 119 R
See application file for complete search history.

(56) References Cited

U.S. PATENT DOCUMENTS 5,092,302 A * 3/1992 Mohan ....................... 123/497
5,740,783 A * 4/1998 Learman et al. ............ 123/497
6,907,775 B1 * 6/2005 Hosoya .................... 73/119 R
2001/0013334 A1 * 8/2001 Tanaka et al. ......... 123/406.47
2005/0193991 A1 * 9/2005 Shin ........................... 123/529
2005/0193992 A1 * 9/2005 Shin ........................... 123/529

* cited by examiner

*Primary Examiner*—Eric S. McCall
(74) *Attorney, Agent, or Firm*—Morgan Lewis & Bockius LLP

(57) ABSTRACT

A method for diagnosing a Liquefied Petroleum Injection fuel pump includes the steps of: inputting an engine Revolutions Per Minute (RPM) and a fuel pump Pulse Width Modulation (PWM) signal into an Electronic Control Unit (ECU) of an interface box; determining whether the RPM indicates that the engine is idling; if the engine is not idling, setting a diagnosis time of the PWM signal to a duration longer than the time the engine takes to deactivate after turning off an LPG switch; determining the operation state of the fuel pump by analyzing the PWM signal; and illuminating a warning lamp if the fuel pump is detected to be operating abnormally or a signal line connecting the fuel pump and the interface box is detected to be disconnected.

5 Claims, 2 Drawing Sheets

| STAKE | DETERMINING THE SIGNAL | WARNING LAMP |
| --- | --- | --- |
| NORMAL OPERATION |   | |
| ABNORMAL OPERATION |   | ON |
| THE SIGNAL LINE IS DISCONNECTED | NO SIGNAL | ON |

DIAGNOSIS METHOD FOR LIQUEFIED PETROLEUM INJECTION FUEL PUMP

CROSS-REFERENCE TO RELATED APPLICATIONS

The present application is based on, and claims priority from, Korean Application Serial Number 10-2004-0029977, filed on Apr. 29, 2004, the disclosure of which is hereby incorporated by reference herein in its entirety.

FIELD OF THE INVENTION

The present invention relates to a method of diagnosing a vehicle Liquefied Petroleum Injection (LPI) fuel pump whereby an erroneous diagnosis of the fuel pump due to a turned off state of a Liquefied Petroleum Gas (LPG) switch is prevented. More particularly, the present invention relates to an interface box that receives a Pulse Width Modulation (PWM) signal from a fuel pump driver and then prolongs the period of time of diagnosing the operation state of the fuel pump.

BACKGROUND OF THE INVENTION

In a Liquefied Petroleum Injection (LPI) system, Liquefied Petroleum Gas (LPG) fuel is generally directly injected into the vehicle engine to improve the engine output and reduce exhaust gas of an LPG vehicle. This conventional system however has a clear drawback, particularly when using a fuel pump driver, which is deactivated when its relay power is insulated by turning off an LPG switch. For instance, after turning off the LPG switch while the ignition is on, if an interface box due does not receive a signal from the fuel pump driver because the pump driver is deactivated, the signal line from the fuel pump driver is determined to be disconnected and an engine warning lamp erroneously illuminates. Though no signal is received from the fuel pump driver because the LPG switch is turned off, an Electronic Control Unit (ECU) of the interface box nevertheless determines the above state as a line-disconnection and illuminates the warning lamp.

SUMMARY OF THE INVENTION

The present invention sets the diagnosis time (the wait time after which the diagnosis occurs) of a fuel pump driver signal in an interface box to a duration longer than the time an engine takes to deactivate after a Liquefied Petroleum Gas (LPG) switch is turned off, thereby preventing an erroneous diagnosis of the fuel pump due to the turned-off state of the LPG switch.

The present invention comprises the steps of: inputting an engine Revolutions Per Minute (RPM) and a fuel pump Pulse Width Modulation (PWM) signal (received from a fuel pump driver) into an Electronic Control Unit (ECU) of an interface box; determining whether the inputted engine RPM indicates that the engine is idling; if the engine RPM indicates that the engine is not idling, setting a diagnosis time of the fuel pump PWM signal to a duration longer than the time an engine takes to deactivate after turning off an LPG switch; determining the operation state of the fuel pump by analyzing the fuel pump PWM signal; and returning to the inputting step if the fuel pump is in normal operation, or illuminating a warning lamp if the fuel pump is detected to be operating abnormally or a signal line connecting the fuel pump and the interface box is detected to be disconnected. Since the diagnosis time allows for the engine to deactivate due to the LPG switch being turned off, the diagnosis is not executed if the engine deactivates due to the LPG switch being turned off. This precludes the erroneous illumination of a warning lamp that occurred in the traditional method wherein the warning lamp was illuminated when the LPG switch was turned off.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
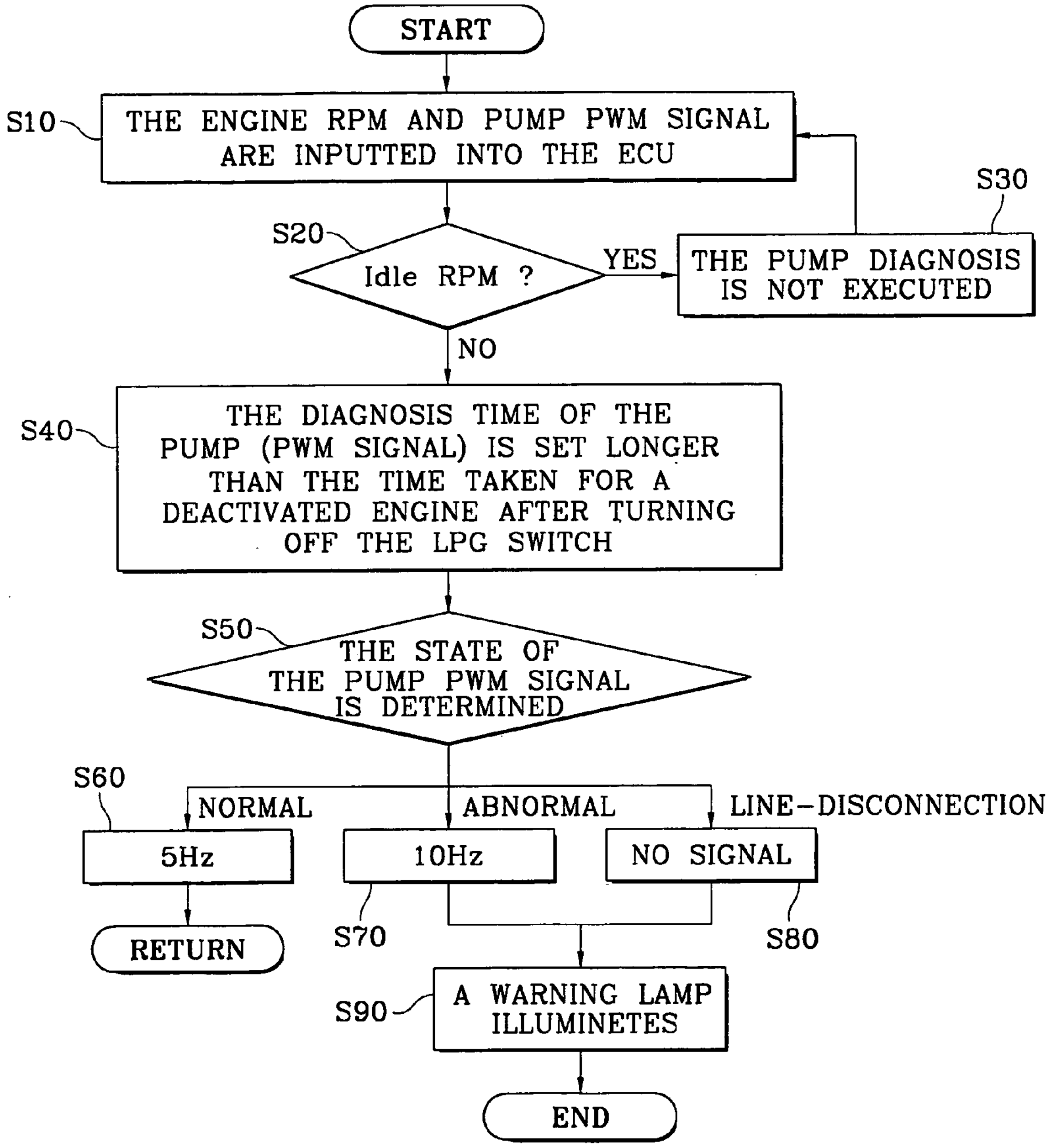
FIG. 1 is a flowchart depicting a diagnosis method of an LPI fuel pump according to an embodiment of the present invention.

Referring to FIG. 1, the present invention includes the following steps for diagnosing a Liquefied Petroleum Injection (LPI) fuel pump. An Electronic Control Unit (ECU) of an interface box receives the present engine Revolutions Per Minute (RPM) and a signal (Pulse Width Modulation: PWM signal) from a fuel pump driver (step 10). Before diagnosing the PWM signal from the fuel pump driver, determining whether the engine is idling, based upon the RPM (step 20). As is well known to one who works in this field, the idle rpm according to the embodiment of the present invention means a minimum engine RPM with the ignition of the vehicle being on, and the idle rpm typically refers to approximately 600–900 rpm. If the engine is idling, the diagnosis of the fuel pump is not executed irregardless of the on and off state of a Liquefied Petroleum Gas (LPG) switch (step 30).

However, if the engine is not idling (i.e., when the vehicle is in motion), a diagnosis time (the wait time after which the diagnosis occurs) for diagnosing the fuel pump is set (step 40). The diagnosis time for the fuel pump is set to exceed (by about 30 seconds or more) the period of time an engine takes to become deactivated after an LPG switch is turned off. Therefore, if an LPG switch is turned off, the engine will deactivate before the diagnosis of the fuel pump occurs. Since the illumination of the warning lamp signifies that the fuel pump is operating abnormally or the signal line between the fuel pump and the interface box is disconnected, the deactivation of the engine prevents the warning lamp from erroneously illuminating. In other words, when no signal is inputted to the interface box due to the turned off LPG switch, the engine stops, thus preventing erroneous illumination of the warning lamp. Further, when reactivating the engine, an accurate diagnosis is made by the diagnosis of the PWM signal.

In one embodiment, the diagnosis time of the PWM signal from the fuel pump driver is determined by mapping the time (set to a longer duration than the time an engine takes to become deactivated after the LPG switch is turned off during the engine operation) per part load of the engine.

In another embodiment, a particular set of values is used to determine whether the fuel pump is operating normally. For an example of a set of values, see FIG. 2. Referring back to FIG. 1, after setting the diagnosis time in step 40, the state of the fuel pump driver PWM signal is determined (step 50).

Figure 2:
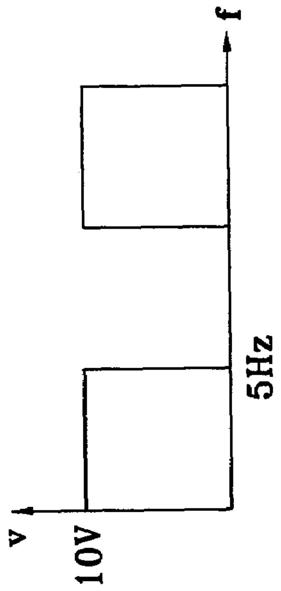
FIG. 2 illustrates signal waves in response to the fuel pump state according to an embodiment of the present invention.
Figure 2:
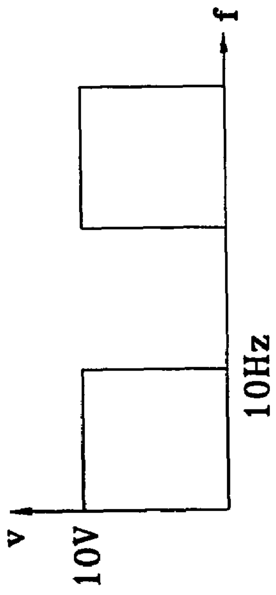

If the PWM signal from the fuel pump driver to the interface box is 5 Hz, the fuel pump is determined to be operating normally (step 60) and the diagnosis returns to step 10. If the PWM signal is 10 Hz in step 50, then the fuel pump is determined to be working abnormally (e.g., when the fuel pump repeats an on and off operation, etc.) (step 70), and the warning lamp illuminates (step 90). If no signal is inputted, the fuel pump is determined to be in a line-disconnection state (step 80), and the warning lamp illuminates (step 90). As shown in FIG. 2, when diagnosing the signal from the fuel pump driver, 5 Hz is defined to indicate normal operation of the fuel pump, 10 Hz is defined to indicate abnormal operation in fuel pump. Although these values are used here, the invention is not limited to these values and may be selected by the user.

The technical concept is not limited to the embodiment of the present invention, however, should be determined by a logical interpretation within the scope of claims of the present invention.

As apparent from the foregoing, there is an advantage in that a diagnosis method for the LPI fuel pump is provided to prevent an incorrect illumination of the engine warning lamp due to a turned-off LPG switch during the diagnosis of the fuel pump.

What is claimed is:

1. A method for diagnosing a Liquefied Petroleum Injection fuel pump, comprising the steps of:

inputting an engine's Revolutions Per Minute and a fuel pump Pulse Width Modulation signal into an Electronic Control Unit of an interface box;

determining whether the inputted engine Revolutions Per Minute indicates that the engine is idling;

setting a diagnosis time for diagnosing the fuel pump Pulse Width Modulation signal if the engine Revolutions Per Minute does not indicate that the engine is idling, wherein the diagnosis time is the wait time after which the diagnosis of the fuel pump Pulse Width Modulation occurs and is a duration longer than the time the engine takes to deactivate after a Liquefied Petroleum Gas (LPG) switch is turned off;

after the diagnosis time elapses, analyzing the Pulse Width Modulation signal inputted from a fuel pump driver and determining the operation state of the fuel pump; and illuminating a warning lamp if the fuel pump is determined to be operating abnormally or no fuel pump Pulse Width Modulation signal was received.

2. The method as defined in claim 1, wherein a diagnosis is not executed for the fuel pump if the engine Revolutions Per Minute indicates that the engine is idling.

3. The method as defined in claim 1, wherein the diagnosis time is determined by mapping a duration, which is longer than the time the engine takes to deactivate after the Liquefied Petroleum Gas switch is turned off during the engine's operation, per part load of the engine.

4. The method as defined in claim 1, wherein the fuel pump is determined to be normal if the inputted Pulse Width Modulation signal is 5 Hz, or abnormal if the Pulse Width Modulation signal is 10 Hz, or disconnected from the interface box if no signal is inputted.

5. A method for diagnosing a Liquefied Petroleum Injection fuel pump, comprising the steps of:

determining when an engine is not idling;

detecting a signal from the fuel pump;

setting a diagnosis wait time that is longer than the time interval required for the engine to deactivate after a Liquefied Petroleum Gas switch is turned off;

allowing the diagnosis wait time to elapse;

determining whether the fuel pump is operating abnormally based upon the signal received from the fuel pump; and illuminating a warning lamp if the fuel pump is determined to be operating abnormally or if no signal was detected from the fuel pump.

* * * * *